(12) United States Patent
Araki et al.

(10) Patent No.: US 6,362,300 B1
(45) Date of Patent: Mar. 26, 2002

(54) MOISTURE-CURABLE POLYURETHANE COMPOSITIONS

(75) Inventors: Kiminori Araki; Hideyuki Matsuda; Eiji Nishi; Takahiro Samata, all of Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/611,757

(22) Filed: Jul. 6, 2000

(51) Int. Cl.[7] .................. C08G 77/26; C08G 18/20; C08G 18/24; C08G 18/18

(52) U.S. Cl. .................. 528/28; 528/58; 528/38; 544/106; 524/425; 524/115; 524/126

(58) Field of Search ............... 528/53, 58, 38, 528/28; 544/106; 524/425, 115, 126

(56) References Cited

U.S. PATENT DOCUMENTS

| | | |
|---|---|---|
| 4,374,237 A | 2/1983 | Berger et al. |
| 4,687,553 A | 8/1987 | Solomon et al. |
| 4,758,648 A | 7/1988 | Rizk et al. |
| 5,623,044 A | 4/1997 | Chiao |
| 5,852,137 A * | 12/1998 | Hsieh et al. |
| 6,020,429 A * | 2/2000 | Yang et al. |

FOREIGN PATENT DOCUMENTS

| | | |
|---|---|---|
| JP | 5-75035 | 10/1993 |
| JP | 7-8982 | 2/1995 |
| JP | 9-32239 | 2/1997 |

* cited by examiner

*Primary Examiner*—Robert Dawson
*Assistant Examiner*—Kuo-Liang Peng
(74) *Attorney, Agent, or Firm*—Finnegan, Henderson, Farabow, Garrett & Dunner LLP

(57) ABSTRACT

A one-component moisture curable polyurethane composition containing a silane adduct is provided. The composition does not suffer from adhesion failure even when curing conditions were changed, and the composition exhibits excellent adhesion to various materials, and in particular, to glass and aluminum with no primer application. The composition also exhibits excellent curability, high foaming resistance, and good elongation. The moisture curable polyurethane composition comprises a urethane prepolymer, and a morpholine catalyst comprising a dimorpholinodiethylether (i) and a N,N-dimethylaminoethylmorpholine (ii). In the polyurethane composition, content of the dimorpholinodiethylether (i) in the polyurethane composition is preferably less than 0.15% by weight, and content of the N,N-dimethylaminoethylmorpholine (ii) in the polyurethane composition is preferably in the range of 0.04 to 2% by weight.

15 Claims, 1 Drawing Sheet

MOISTURE-CURABLE POLYURETHANE COMPOSITIONS

BACKGROUND OF THE INVENTION

1. Field of the Invention

This invention relates to a one-component moisture curable urethane sealant composition which can be used for such applications as a sealant, an adhesive, and a coating agent for automobile, construction, and structural purposes. More specifically, this invention relates to a one-component moisture curable urethane sealant composition which exhibits high curing speed, no adhesion failure upon catalytic acceleration of the curing, excellent storage stability in the absence of moisture, sufficient curability in the presence of atmospheric moisture, retention of adhesion even in the change of curing environment, and sufficient form retention after the coating of the sealant.

Furthermore, the present invention provides a moisture curable polyurethane composition which exhibits excellent adhesion to glass, resin, metal, and the like, and in particular, to aluminum as well as excellent curability, high foaming resistance, and good elongation even when no primer is used.

2. Background Art

Moisture-curable (one-component) polyurethane composition comprising the main component of urethane polymer and the curing agent (also referred to as the curing catalyst) has been widely used as an adhesive between metal surfaces, an adhesive between chassis and window glass, a sealant, and a coating agent in the fields of automobile production, construction, and structural engineering.

A moisture curable polyurethane composition generally contains a tertiary amine compound and/or a metal carboxylate as a curing catalyst, and the curing speed of the composition is adjusted by the type and the content of the curing catalyst.

Such moisture curable polyurethane composition has the merit that storage and working can be accomplished by handling the one-component composition. However, the curing speed and the storage stability are contradictory features and there is a problem that a composition enjoying a high curing speed essentially suffer from poor storage stability and vice versa.

Various curing agents have been investigated which fulfil the requirements for both the curing speed and the storage stability. For example, JP-B 5-75035 proposes use of dimorpholinodiethylether (DMDEE) as a catalyst for moisture curing of the urethane polymer which exhibits both sufficient storage stability and sufficient curability. JP-B 7-8982 proposes use of di[2-(3,5-dimethylmorpholino)ethyl]ether for improving low temperature curability of the DMDEE.

The dimorpholinodiethylether and its derivatives have no problems as long as they are used in normal environment. However, when used under high temperature, high humidity conditions, they are involved with the risk of debonding (PS) at the surface between the primer and the sealant. A reliable adhesion with the primer that is not affected by changes in the environmental conditions is highly awaited.

When the moisture curable polyurethane composition is used in automobile production line and the like for metal-to-metal adhesion or metal-to-glass adhesion, a primer such as silane coupling agent is usually applied to the adherend surface before the application of the polyurethane composition to thereby improve the curing speed and the adhesion. Moisture curable polyurethane compositions which can be applied with no preliminary primer coating step are also investigated. For example, U.S. Pat. No. 4,374,237 proposes a polyurethane sealant containing a prepolymer having two or more silane groups per one molecule produced by reacting a urethane prepolymer with a secondary aminosilane. U.S. Pat. No. 4,687,533 proposes a polyurethane sealant containing a urethane prepolymer which has an alkoxysilane as its pendant group.

These polyurethane sealants, however, suffer from insufficient speed of curing, and for example, use of such sealant for adhesion of window glass to the chassis of an automobile is involved with safety problems. These polyurethane sealants also do not meet the requirements for the physical properties of structural materials.

U.S. Pat. No. 5,623,044 describes a polyurethane sealant containing the reaction product of a secondary aminosilane and a polyisocyanate. However, the polyurethane sealant containing such reaction product, namely, isophorone diisocyanate trimer, biuret modification of hexamethylenediisocyanates, polyphenyl polymethylene isocyanate, or the like suffers from the problem of insufficient initial adhesion. The large content of such modified isocyanate should adversely affect the physical properties of the sealant. Therefore, application of a primer containing a silane coupling agent is required when such polyurethane sealant is used for bonding a window glass to the chassis of an automobile.

JP-A 9-32239 proposes a method for dressing an exterior wall with tiles wherein a moisture curable urethane-based adhesive is described. In JP-A 9-32239, a urethane prepolymer is produced by reacting a trifunctional polyol and a polyisocyanate compound, and the urethane prepolymer is blended with an amino silane coupling agent and a glycidyl silane coupling agent to produce the moisture curable urethane-based adhesive.

A moisture curable polyurethane composition also suffers from the problem of foaming caused by the generation of carbon dioxide in the course of curing due to the reaction between the free isocyanate in the urethane prepolymer and the moisture. Such foaming is particularly significant under high temperature, high humidity conditions, and such foaming has been a serious problem in the use of the moisture curable polyurethane composition for applications such as sealing material and automobile sealant wherein the composition is exposed to high temperature, high humidity conditions in the course of the curing.

In view of the situation as described above, there is a strong demand for a polyurethane sealant which has obviated the problems as described above, and which exhibits excellent adhesion to glass, metal, plastic, and coated steel plates even without using any primer.

SUMMARY OF THE INVENTION

Accordingly, first object of the present invention is to provide a one-component moisture curable polyurethane composition employing a dimorpholinodiethylether or a derivative thereof for the catalyst which has obviated the problem of adhesion failure upon accelerated curing; which has high storage stability as well as sufficient curability by the moisture in the atmosphere; and whose adhesion is not adversely affected by unfavorable change in the curing environment.

The inventors of the present invention have found that such object can be attained by using a morpholine compound catalyst comprising dimorpholinodiethylether in combination with N,N-dimethylaminoethylmorpholine, and the polyurethane composition of the present invention is thereby provided.

The inventors of the present invention have also made an extensive investigation for the moisture curable urethane sealant composition which can be used for adhesion of glass, metal, plastic, coated steel plate, and other materials even without using any primer, and found that such object can be attained by incorporating in the polyurethane composition a silane adduct (which may be hereinafter sometimes referred simply as an adduct) of a polyisocyanate compound of particular structure and a secondary aminoalkocysilane of particular structure as described below. Such moisture curable urethane sealant composition is also provided.

The present invention also provides a novel polyurethane composition comprising the adduct as described above and (B') at least one tertiary amine catalyst having morpholino group and/or dimethyamino group, which may be the morpholine catalyst of the present invention as described above.

Accordingly, the present invention provides a moisture curable polyurethane composition comprising (A) a urethane prepolymer, and (B) a morpholine catalyst comprising (i) a dimorpholinodiethylether represented by formula (1):

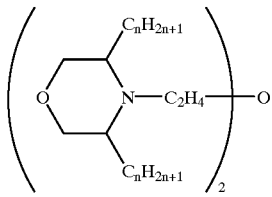

wherein n is 0, 1, or 2, and (ii) a N,N-dimethylaminoethylmorpholine represented by formula (2):

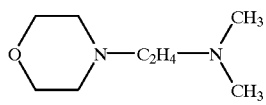

In the polyurethane composition, the content of the dimorpholinodiethylether (i) is preferably less than 0.15% by weight.

The preferable content of the N,N-dimethylaminoethylmorpholine (ii) in the polyurethane composition is generally in the range of 0.04 to 2% by weight.

The moisture curable polyurethane composition may further comprise 2 to 20% by weight of heavy calcium carbonate (C) having an average particle diameter of 1.0 to 3.2 μm, and the thus composition is appropriate for a sealant.

The present invention also provides a moisture curable polyurethane composition comprising (A) a urethane prepolymer, (B') at least one tertiary amine catalyst having morpholino group and/or dimethyamino group, and (D) at least one silane adduct selected from the group consisting of (D-1) a silane adduct obtained by addition reaction between a polyisocyanate which is a product of urethane reaction between at least one member selected from xylene diisocyanate, 1,3- or 1,4-di- (isocyanate methyl)cyclohexane, and derivatives thereof, and a compound having at least three active hydrogen atoms, and which has at least three isocyanate groups in one molecule, and a secondary aminoalkoxysilane wherein the nitrogen atom has bonded thereto an aromatic ring or its derivative, and (D-2) a silane adduct having a lysine skeleton obtained by addition reaction between a lysine isocyanate having 2 or 3 isocyanate groups and a secondary aminoalkoxysilane wherein the nitrogen atom has bonded thereto an aromatic ring.

The tertiary amine catalyst (B') may comprise a morpholine catalyst (B) comprising (i) the dimorpholinodiethylether represented by the formula (1), and (ii) the N,N-dimethylaminoethylmorpholine represented by the formula (2).

The composition may preferably contain, as the tertiary amine catalyst (B'), 0.05 to 0.15 parts by weight of dimorpholinodiethylether (i) and 0.05 to 2 parts by weight of N,N-dimethylaminoethylmorpholine (ii) per 100 parts by weight of the total of the urethane prepolymer (A) and the silane adduct (D).

The tertiary amine catalyst (B') may be bis(2-dimethylaminoethyl)ether (iii) represented by the following formula (3):

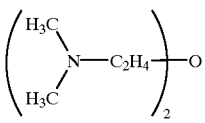

The polyurethane composition containing the tertiary amine catalyst (B') may further comprise (E) at least one member selected from the group consisting of a phosphite compound, a phosphonous acid ester compound, phosphinous acid ester compound, a phosphine compound, and mixtures thereof. Incorporation of the organophosphorus compound (E) is particularly desirable when the compound (B') is bis(2-dimethylaminoethyl)ether (iii).

Preferably, the moisture curable polyurethane composition of the present invention further comprises (F) an organotin compound.

The composition may preferably contain 0.002 to 0.1 parts by weight of said organotin compound (F) per 100 parts by weight of the total of the urethane prepolymer (A) and the silane adduct (D).

The urethane prepolymer (A) used in the present invention is generally a urethane prepolymer having free isocyanate group.

DETAILED DESCRIPTION OF THE INVENTION

Figure 1:
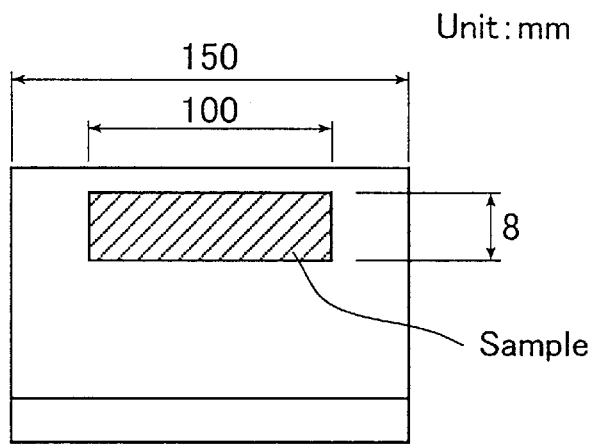
FIG. 1 is a cross sectional view of the polyurethane composition immediately after the extrusion of the composition on the test plate in the bead forming test of Examples of the present invention and Comparative Examples.

Next, the moisture curable polyurethane composition (which may be hereinafter simply referred to as the composition of the present invention) is described in detail.

The urethane prepolymer (A) contained in the composition of the present invention may be the one which is used in the conventional one-component polyurethane composition which is a reaction product between a polyol compound and an excessive amount of a polyisocyanate compound (i.e. OH group and an excessive amount of NCO group).

The polyol compound used in producing the urethane prepolymer (A) may be the one used in producing the conventional one-component polyurethane composition. Exemplary such polyol compounds include polyether polyol, polyester polyol, and other polyols as well as mixtures thereof.

Preferable exemplary polyether polyols include polyether polyols obtained by addition of one or more polyhydric alcohols selected from ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, pentaerythritol, and the like to one or more oxides selected from propylene oxide, ethylene oxide, butylene oxide, stylene oxide, and the like; and polyoxytetramethylene oxide. Examples are polyoxypropylene glycol (PPG), polytetramethylene etherglycol (PTMG), polyethylene glycol (PEG), and polyoxypropylene triol.

Preferable exemplary polyester polyols include polycondensates of one ore more of ethylene glycol, propylene glycol, butanediol, pentanediol, hexanediol, cyclohexanedimethanol, glycerin, 1,1,1-trimethylolpropane, and other low molecular weight polyols; and one or more of glutaric acid, adipic acid, pimelic acid, suberic acid, sebasic acid, terephthalic acid, isophthalic acid and other low molecular weight carboxylic acids and oligomeric acids; ring-opening polymerization product of propionlactone, valerolactone, caprolactone and the like.

Other preferable polyols include polymer polyol, polycarbonate polyol, polybutadiene polyol hydrogenated polybutadiene polyol, acryl polyol, and the like; as well as ethylene glycol, diethylene glycol, propylene glycol, dipropylene glycol, butanediol, pentanediol, hexanediol, and other low molecular weight polyols.

The polyol used in the present invention is preferably a polyether polyol having a number average molecular weight in the range of 1000 to 15000, and in particular, 1000 to 10000 in view of preferable glass transition temperature and physical properties as a sealant of the composition after curing.

The polyisocyanate compound used in producing the urethane prepolymer (A) may be the one used in producing the conventional one-component polyurethane composition. Exemplary such polyisocyanate compounds include:

aromatic polyisocyanates such as 2,4-tolylene diisocyanate, 2,6-tolylene diisocyanate, phenylene diisocyanate, diphenylmethane-4,4'-diisocyanate, naphthalene-1,5-diisocyanate, and triphenylmethane triisocyanate, and hydrogenated products thereof;

aliphatic polyisocyanates such as ethylene diisocyanate, propylene diisocyanate, tetramehylene diisocyanate, hexamethylene diisocyanate, and the like;

alicyclic polyisocyanates such as isophorone diisocyanate and the like; and arylaliphatic polyisocyanates such as xylylene diisocyanate and the like and hydrogenated products thereof. Such polyisocyanate compounds may be used either alone or in combination of two or more.

The urethane prepolymer (A) used in the present invention can be produced by reacting the polyol compound as described above with an excessive amount of the polyisocyanate compound as described above.

Accordingly, the urethane prepolymer (A) has free isocyanate group.

The polyol compound and the polyisocyanate compound may be used at the ratio of the isocyanate group in the polyisocyanate compound to the hydroxyl group in the polyol compound (namely, as the isocyanate group/hydroxyl group ratio) of 1.2 to 2.5, and preferably 1.5 to 2.4. When the polyol compound and the polyisocyanate compound are used at the ratio within such range, the resulting urethane polymer will have an adequate viscosity.

The urethane prepolymer (A) can be produced by the same procedure as the conventional urethane prepolymers, for example, by heating the polyol compound and the polyisocyanate compound of the above-specified weight ratio at a temperature of 50 to 100° C. under agitation, and in optional presence of a urethane forming catalyst such as organotin compound, organic bismuth, amine, and the like if necessary.

The thus obtained urethane prepolymer (A) may preferably have the isocyanate group at an average number of at least 2.0, and preferably at least 2.2 per one molecule, and in percent by weight of at least 0.4%, and preferably at least 0.5%. The urethane prepolymer (A) may preferably have an average molecular weight of 2000 to 20000, and more preferably, 2000 to 15000 since the composition of the present invention produced by using the urethane prepolymer (A) having the average molecular weight within such range will be provided with favorable viscosity, adhesion, and sealant properties after the curing (including hardness and modulus).

First of all, the present invention provides a moisture curable polyurethane composition comprising the urethane prepolymer (A) as described above, and a morpholine catalyst (B) comprising (i) a dimorpholinodiethylether represented by formula (1):

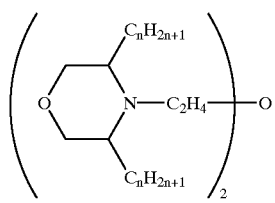

(1)

wherein n is 0, 1, or 2, and (ii) a N,N-dimethylaminoethylmorpholine represented by formula (2):

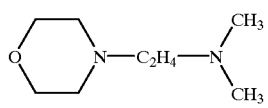

(2)

In the formula (1), n is 0, 1, or 2, and preferably 0 or 1. When n is 0, the catalyst exhibits high catalytic activity per unit weight, and when n is 1, the resulting composition exhibits excellent curability at low temperature.

The moisture curable polyurethane composition comprising the urethane prepolymer (A) and the morpholine catalyst (B) may further comprise (C) heavy calcium carbonate having an average particle diameter of 1.0 to 3.2 μm at a content of 2 to 20% by weight, and preferably, at a content of 3 to 15% by weight.

When the heavy calcium carbonate of such particle size is present, the composition will exhibit high storage stability in the absence of moisture without detracting from the smooth sealant appearance.

The polyurethane composition containing the heavy calcium carbonate as described above is preferable since the composition exhibits the so called "depth curability" which is indicated by the thickness of the cured film formed in the presence of moisture with the lapse of time.

The polyurethane composition as described above is quite preferable for use as a sealing material, and in a preferable embodiment of such polyurethane composition, content of the dimorpholinodiethylether (i) is preferably less than 0.15% by weight, more preferably less than 0.14% by weight, and most preferably less than 0.13% by weight. With regard to the lower limit of the effective content, the dimorpholinodiethylether (i) is generally used at a content of at least 0.04% by weight, preferably at least about 0.05% by weight, more preferably at least about 0.08% by weight, and most preferably at least about 0.09% by weight.

The content of the N,N-dimethylaminoethylmorpholine (ii) is generally in the range of 0.05 to 2% by weight, preferably 0.05 to 1% by weight, and most preferably about 0.05 to about 0.7% by weight.

When the catalyst is used in the amount as described above, the resulting composition exhibits sufficient curability as well as good adhesion with no debonding between the primer and the sealant even in the change of curing conditions, and in particular, under high temperature, high humidity conditions.

Dimorpholinodiethylether (i) realizes high curing speed. However, use of the dimorpholinodiethylether (i) alone is involved with the risk of debonding between the primer and the sealant under high temperature, high humidity conditions as well as loss of form retention capability of the sealant applied after storage. Use of the dimorpholinodiethylether (i) in combination with the N,N-dimethylaminoethylmorpholine (ii) avoids such problems while retaining storage stability, curing speed, adhesion, and other properties.

Use of the polyurethane composition as described above will provide a moisture curable urethane sealant exhibiting sufficient adhesion with the primer under high temperature, high humidity conditions, excellent storage stability, as well as satisfactory curability. Use of such polyurethane composition also avoids the problem of adhesion failure caused by the change in curing environment.

A preferable embodiment of the urethane prepolymer (A) used for the sealing material is a urethane prepolymer produced by reacting a mixture of polyether triol (polyoxyalkylene triol) and polyether diol (polyoxyalkylene diol) with a polyisocyanate at the NCO group/OH group ratio in equivalent of 1.1 to 2.5.

In such an embodiment, the polyether triol used is preferably a polyoxypropylene triol which has 3 hydroxyl groups per one molecule and a number average molecular weight of about 5000;

the polyether diol is preferably a polypropyleneether diol which has 2 hydroxyl groups per one molecule and a number average molecular weight of about 2000; and the polyisocyanate is preferably 4'-diphenylmethane diisocyanate.

Accordingly, a one-component moisture curable urethane composition according to an exemplary embodiment comprises
(A) a urethane polymer which is a reaction product of a mixture of a polyether triol and a polyether diol having a number average molecular weight of 1000 to 7000 with 4,4'-diphenylmethane diisocyanate at the NCO group/OH group ratio in equivalent of 1.1 to 2.5;
(B) a catalyst comprising (i) dimorpholinodiethylether represented by the formula (1) at a content of less than 0.15% by weight in the composition and (ii) N,N-dimethylaminoethylmorpholine represented by the formula (2) at a content of 0.05 to 2% by weight of the composition; and
(C) heavy calcium carbonate having an average particle diameter of 1.0 to 3.2 μm at a content of 2 to 20% by weight of the composition.

The production method of the polyurethane composition as described above is not limited to any particular method, and an exemplary method is the production by fully kneading the components except for the curing catalyst and the solvent under reduced pressure for uniform dispersion of the components; adding the curing catalyst as a solution in a solvent such as xylene; and fully kneading the mixture under reduced pressure to thereby produce the composition.

The composition of the present invention may also contain a filler, a plasticizer, a solvent, and the like which are inert to the isocyanate group in addition to the components as described above to thereby impart the resulting composition with the desired physical and other properties. Exemplary fillers include carbon black, clay, talc, and mixtures thereof, and exemplary plasticizers include phthalic acid derivatives such as dibutyl phthalate, dioctyl phthalate as well as derivatives of tetrahydrophthalic acid, azelaic acid, maleic acid, trimellitic acid, isophthalic acid, adipic acid, itaconic acid, citric acid, and the like. Exemplary solvents include aromatic hydrocarbon solvents such as toluene and xylene.

The polyurethane composition containing a silane adduct (D) as described after exhibits excellent adhesion in the absence of a primer.

Next, a moisture curable polyurethane composition according to the present invention comprising
(A) the urethane prepolymer,
(B') at least one tertiary amine catalyst having morpholino group and/or dimethyamino group, and
(D) a silane adduct which is an adduct of a particular secondary aminoalkoxysilane (i) and a particular polyisocyanate (ii) or (iii) is described below.

More illustratively, the silane adduct (D) is at least one member selected from the group consisting of
(D-1) a silane adduct obtained by addition reaction between
a secondary aminoalkoxysilane (i) and
a polyisocyanate (ii) which is a product of urethane reaction between a particular diisocyanate and a compound having at least three active hydrogen atoms; and
(D-2) a silane adduct having a lysine skeleton obtained by addition reaction between
a secondary aminoalkoxysilane (i) and
a lysine isocyanate (iii) having 2 or 3 isocyanate groups.

The secondary aminoalkoxysilane (i) is a compound which has a secondary amino group and a hydrolyzable alkoxy group bonded to the silicon, and has a structure wherein the nitrogen atom of the amino group has bonded thereto an aromatic ring or its derivative. The adduct obtained by using the secondary aminoalkoxysilane having such structure realizes excellent adhesion to the adherend. An example of such secondary aminoalkoxysilane is 3-phenylaminopropyltrimethoxysilane, and a commercially available product such as Y-9669 (trade name) manufactured by Nippon Uniker K.K. may be employed.

The polyisocyanate (ii) which undergoes an addition reaction with the secondary aminoalkoxysilane (i) to form the silane adduct (D-1) is an adduct of a particular diisocyanate and a compound having three or more active hydrogen atoms.

In the present invention, the particular diisocyanate is at least one member selected from xylene diisocyanate (XDI), 1,3- or 1,4-di(methylisocyanate)cyclohexane (hydrogenated XDI), and derivatives thereof. Use of such diisocyanate provides excellent adhesion to the composition of the present invention, in particular, to aluminum.

The compound having at least three active hydrogen atoms (hereinafter sometimes referred as the active hydrogen-containing compound) may preferably have a number average molecular weight of up to 500, and more preferably up to 400. Preferable examples of such active hydrogen-containing compound include polyols such as trimethylolpropane, 1,2,5-hexanetriol, glycerin, and pentaerythritol, and use of trimethylolpropane (TMP) is particularly preferable.

When the polyisocyanate (ii) is formed by urethane bonding of the particular diisocyanate and the active hydrogen-containing compound, the active hydrogen-containing compound is generally used in an amount of 0.4 to 0.7 equivalents (equivalent of active hydrogen), and preferably 0.5 to 0.6 equivalents per 1 equivalent (equivalent of NCO) of the diisocyanate.

It should also be noted that the active hydrogen-containing compound and/or the diisocyanate may be respectively used either alone or as a combination of two or more.

The reaction between the active hydrogen-containing compound (for example, polyol) and the diisocyanate may be conducted by the method generally used in reacting an alcohol and an isocyanate. In the present invention, the polyisocyanate (ii) used may be a commercially available polyisocyanate such as D-120N (NCO, 11.0%) manufactured by Takeda Chemical Industries, Ltd. and D-110N (NCO 11.7%) manufactured by Takeda Chemical Industries, Ltd. The polyisocyanate compound may contain a solvent and the like.

The polyisocyanate having three or more isocyanate groups in one molecule known in the art include compounds of biuret structure and isocyanurate structure. In the present invention, an adduct of the structure wherein the particular diisocyanate and the compound having at least three active hydrogen atoms have formed urethane bonding as described above is used for the production of the silane adduct (D-1). Use of such polyisocyanate (ii) enables high adhesion by small content as well as strong adhesion to aluminum.

When the secondary aminoalkoxysilane (i) and the polyisocyanate (ii) are reacted, the polyisocyanate (ii) is used at an amount in the range of 2.0 to 6.0 equivalents (equivalent of NCO), and preferably 2.4 to 6.0 equivalents per 1 equivalent (equivalent of NH) of the secondary aminoalkoxysilane (i). Use of the secondary aminoalkoxysilane (i) and the polyisocyanate (ii) at such ratio is preferable in view of the foaming resistance of the resulting composition.

The reaction between the secondary aminoalkoxysilane (i) and the polyisocyanate (ii) may also be conducted by optionally adding an adequate solvent such as toluene for the purpose of adjusting the viscosity.

In the reaction as described above, a reaction solution containing the adduct of the polyisocyanate (ii) and the secondary aminoalkoxysilane (i) as its main component is obtained. In the present invention, the solution comprising the reaction product including the adduct as described above, the unreacted ingredients, and the solvent can be used as the silane adduct (D-1) with no further purification. The adduct is preferably a silane compound represented by the following formula (4) as shown below or a mixture of such silane compounds.

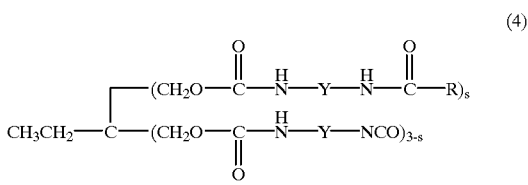

(4)

wherein s is 0, 1, 2 or 3;

Y is

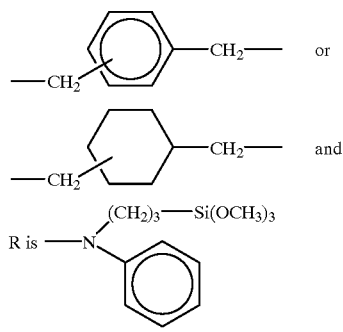

The silane adduct (D-2) having a lysine skeleton is obtained by addition reaction between a lysine isocyanate (iii) having 2 or 3 isocyanate groups and a secondary aminoalkoxysilane (i).

More illustratively, the lysine isocyanate is shown by the formula (5) as shown below.

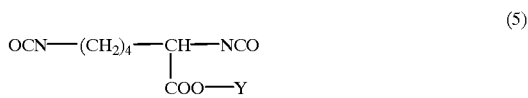

(5)

wherein Y is an alkyl having 1 to 6 carbon atoms or a group represented by —RNCO wherein R is an alkylene having 1 to 6 carbon atoms.

Exemplary such lysine isocyanates are

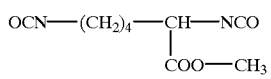

lysine diisocyanates (LDI), and

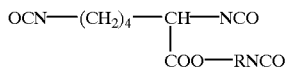

lysine triisocyanates (LTI).

The lysine diisocyanate and the lysine triisocyanate as described above may be used alone or in combination of two or more as the lysine isocyanate (ii).

In producing the silane adduct (D-2) having the lysine skeleton, the lysine triisocyanate and/or the lysine diisocyanate is generally used at an amount of 2.0 to 6.0 equivalents (equivalent of NCO) (in total when used in combination of two or more) per one equivalent (equivalent of NH) of the secondary aminoalkoxysilane (i). Such amount is preferable in view of the favorable foaming resistance of the resulting composition.

The silane adduct (D-1) and the silane adduct having the lysine skeleton (D-2) contain the isocyanate group at an average number of at least 1.5, and preferably 1.5 to 2.5, and hydrolizable alkoxy group bonded to silicon at an average number of at least 1.5, and preferably 1.5 to 9.0. The number of the isocyanate group within such range is preferable in view of the viscosity, adhesion, curability, and foaming resistance of the resulting composition. The number of the alkoxy group within such range is preferable in view of the adhesion and curability of the resulting composition.

In the present invention at least one member selected from the group consisting of the silane adduct (D-1) and the silane adduct having a lysine skeleton (D-2) as described above is used as the silane adduct, and the content of the silane adduct (D) in the composition of the present invention is generally in the range of 0.07 to 10 parts by weight, and preferably 0.07 to 9 parts by weight per 100 parts by weight of the urethane prepolymer (A). The content of the silane adduct (D) in such range is preferable in view of the reduced foaming in the curing and curability of the resulting composition of the present invention. The content of the silane adduct (D) in the range of 0.07 to 6.5 parts by weight is particularly preferable in view of the good adhesion to the glass and aluminum attained with no loss in the elongation of the cured product.

The tertiary amine catalyst (B') which constitutes the composition of the present invention with the silane adduct (D) has morpholino group and/or dimethylamino group.

A compound which has at least two such structures in the molecule is preferable for the tertiary amine catalyst (B'), and exemplary such compounds include compound (B'-1) which has two morpholine structures in the molecule; compound (B'-2) which has one morpholine structure and one dimethylamino group structure in the molecule; and compound (B'-3) which has two dimethylamino group structures in the molecule.

Examples of the compound (B'-1) which has two morpholine structures in the molecule and the compound (B'-2) which has one morpholine structure and one dimethylamino group structure in the molecule are dimorpholinodiethylether and N,N-dimethylaminoethylmorpholine which have been indicated as examples of morpholine catalysts (B)(i) and (B)(ii), respectively.

Examples of the compound (B'-3) which has two dimethylamino group structures in the molecule is bis(2-dimethylaminoethyl)ether represented by the following formula (3):

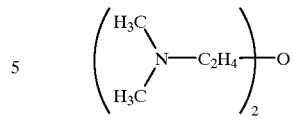

(3)

These compounds can be used either alone or in combination of two or more. In the present invention, however, use of the compound (B'-1) in combination with the compound (B'-2), and use of the compound (B'-3) alone are preferable.

When the compound (B'-1) is used in combination with the compound (B'-2), the compound (B'-1) is used at an amount of 0.05 to 0.15 parts by weight, and preferably 0.08 to 0.14 parts by weight, and the compound (B'-2) is used at an amount of 0.05 to 2 parts by weight, and preferably 0.05 to 1 part by weight per 100 parts by weight of the total of the urethane prepolymer (A) and the silane adduct (D).

When the compounds (B'-1) and (B'-2) are used at such amounts, the resulting composition will exhibit rapid curing of sufficient level and the composition is free from the risk of debonding between the primer or the adherend and the sealant even if the curing environment had changed, and in particular, upon curing under high temperature, high humidity conditions. Use of the compounds in such amount is also favorable in view of the reduced foaming, as well as storage stability and form retention after the sealant application.

When the compound (B'-3) is used, the amount used may be determined in accordance with the desired curing speed. In practical point of view, the compound (B'-3) is blended at an amount of 0.005 to 1 part by weight, and preferably 0.01 to 0.5 parts by weight per 100 parts by weight of the total of the urethane prepolymer (A) and the silane adduct (D). When the amount blended is less than 0.005 parts by weight, curing speed is below practical level, and when the amount is in excess of 1 part by weight, curing speed is too fast to detract from handling convenience.

When the compound (B'-3) is used alone, the compound (B'-3) is preferably used in combination with a phosphite compound, phosphonous acid ester compound, phosphinous acid ester compound, phosphine compound, or a mixture thereof as described below (hereinafter sometimes referred to as organophosphorus compound for simplicity) (E). A compound having dimethylamino group structure as in the case of the compound (B'-3) is likely to be highly reactive and unstable in the presence of moisture, and inclusion of an organophosphorus compound (E) is effective in maintaining storage stability.

Exemplary phosphite compounds include triphenyl phosphite, tris(nonylphenyl) phosphite, triethyl phosphite, triisopropyl phosphite, triisobutyl phosphite, tridecyl phosphite, triisodecyl phosphite, tris(tridecyl) phosphite, tri(2-ethylhexyl) phosphite, diphenylmono(2-ethylhexyl) phosphite, diphenylmonodecyl phosphite, diphenylmono (tridecyl) phosphite, dilauryl hydrogen phosphite, dioleyl hydrogen phosphite, diphenyl hydrogen phosphite, tetraphenyldipropylene glycol diphosphite, tetraphenyltetra (tridecyl)pentaerythritol tetraphosphite, tetra(tridecyl)-4,4'-isopropylidenediphenyl diphosphite, trilauryl trithiophosphite, bis(tridecyl)pentaerythritol diphosphite, tris(2,4-di-t-butylphenyl) phosphite, tricyclohexyl phosphite, dicyclohexyl-2,4-di-t-butylphenyl phosphite, hydrogenated bisphenol A pentaerythritol phosphite polymer, hydrogenated bisphenol A phosphite polymer, and the like.

Exemplary phosphine compounds include triphenylphosphine, triorthotolylphosphine, trimethatolylphosphine, triparatolylphosphine, tris 4-methoxyphenylphosphine, diphenylcyclohexylphosphine, dicyclohexylphenylphosphine, tricyclohexylphosphine, trioctylphosphine, tributylphosphine, 1,2-bis(diphenylphosphino)ethane, 1,3-bis(diphenylphosphino) propane, 1,4-bis(diphenylphosphino)butane, tribenzylphosphine, and the like.

Exemplary phosphonous acid ester compounds include phenylphosphonous acid diethyl ester, and 2-phenyl-1,3,2-dioxaphospholane. Exemplary phosphinous acid ester compounds include diphenylphosphinous acid ethyl ester, and diphenylphosphinous acid butyl ester. Such organophosphorus compound may be used either alone or in combination of two ore more, and in the present invention, use of a phosphite compound or a phosphine compound is particularly preferable.

The organophosphorus compound (E) is preferably used at an amount of about 0.001 to about 30 parts by weight, and more preferably about 0.01 to about 3 parts by weight per 100 parts by weight of the total of the urethane prepolymer (A) and the silane adduct (D).

The organophosphorus compound (E) may be included in the polyurethane composition of the present invention not only as a stabilizer for the catalyst component (B'-3). When the component (B'-3) is used, an excellent storage stability is realized when the organophosphorus compound (E) is blended at an amount of 0.05 to 5 parts by weight, and preferably at an amount of 0.01 to 3 parts by weight.

Preferably, the composition of the present invention further comprises an organotin compound (F). Exemplary organotin compound (F) include tin carboxylates such as stannous octanoate, stannous oleate, stannous acetate, and stannous laurate, and dialkyl tin dicarboxylates such as dioctyl tin dilaurate (DOTL), dibutyl tin laurate (DBTL), and dibutyl tin diacetate, which may be used alone or in combination of two or more. Among these, the preferred are dioctyl tin dilaurate (DOTL), and dibutyl tin dilaurate (DBTL).

The organotin compound (F) is preferably blended at an amount of 0.002 to 0.1 parts by weight per 100 parts by weight of the total of the urethane prepolymer (A) and the silane adduct (D). When the organotin compound (F) used in such amount, sufficient adhesion is realized without using any primer. It should be noted that use of the organotin compound (F) at an amount in excess of 0.1 parts by weight is likely to result in an increased thermal deterioration speed.

In addition to the components as described above, the moisture curable polyurethane composition of the present invention may further contain other components at an amount that does not adversely affect the advantageous effects of the present invention. For example, the composition of the present invention may further contain a silane compound (G) represented by the following formula (G):

wherein $R^a$ O is a hydrolyzable alkoxy group; $R^b$ is an alkyl group having 1 to 3 carbon atoms; and $R^c$ is an alkenyl group-containing organic group which may optionally contain a hetero atom; t is 1, 2, or 3.

The hydrolyzable alkoxy group represented by $R^a$ O is generally an alkoxy group containing 1, 2 or 3 carbon atoms, and preferably methoxy group or ethoxy group. $R^b$ is preferably methyl group or ethyl group.

Exemplary hetero atoms which may be included in the $R^c$ group include oxygen, nitrogen, sulfur, and the like. Examples of the alkenyl group-containing organic group $R^c$ which may optionally contain a hetero atom include —CH=CH$^2$ (vinyl group), —(CH$_2$)$_4$—CH=CH$_2$, —(CH$_2$)$_8$—CH=CH$_2$, —Ph—CH=CH$_2$ (wherein Ph represents phenyl group), —(CH$_2$)$_3$—O—CH=CH$_2$, —(CH$_2$)$_{10}$—COO—CH=CH$_2$, —(CH$_2$)$_3$—OCO—CH=CH$_2$, —(CH$_2$)$_3$—OCO—C(CH$_3$)=CH$_2$ (methacryloxypropyl group), and —(CH$_2$)$_3$—O—(CH$_2$)$_2$—OCO—C(CH$_3$)=CH$_2$.

Among these, the $R^c$ group is most preferably vinyl group, methacryloxypropyl group, and the like.

Examples of the alkenyl group-containing silane compound (G) represented by the general formula (6) as described above are vinylmethoxysilane, 3-methacryloxypropyltrimethoxysilane, and the like and use of such compound is preferable.

The moisture curable polyurethane composition of the present invention may contain the alkenyl group-containing silane compound (G) at an amount of 0.05 to 10 parts by weight, and preferably 0.05 to 7 parts by weight per 100 parts by weight of the urethane prepolymer (A).

When the alkenyl group-containing silane compound (G) is added to the urethane prepolymer (A) and the silane adduct (D) containing both the NCO group and the alkoxy group, control of modulus of the moisture curable polyurethane composition is facilitated to enable improvement in elongation (Eb), and hence, improvement in elasticity (flexibility). It should also be noted that the addition of the component (G) does not adversely affect the excellent adhesion of the polyurethane composition.

The composition of the present invention may also contain appropriate additives in addition to the components as described above to impart the resulting composition with the desired physical properties. Exemplary such additives include fillers such as carbon black, clay, talc, calcium carbonate, white carbon, and silicic anhydride; plasticizers such as dibutyl phthalate, dioctyl phthalate, tetrahydrophthalic acid, azelaic acid, and maleic acid; solvents such as toluene, xylene, hexane, and heptane; cure accelerators such as dioctyl tin laurate, dibutyl tin laurate, tin octylate, lead octylate, and tertiary amine; epoxysilane and isocyanate silane having only one isocyanate in one molecule.

The method for producing the composition of the present invention is not limited to any particular method, and the composition may be produced as in the case of conventional one-component polyurethane composition. The production is preferably conducted under the conditions wherein the compounds are maintained at a low water content, and more preferably, under anhydrous conditions. When water is present in production system, the reaction mixture will exhibit high viscosity and the silane adduct (D) will undergo hydrolysis, and the adhesion of the resulting composition of the present invention will be insufficient. In an exemplary production method, the composition is produced by adequately using the urethane prepolymer (A), the silane adduct (D), the tertiary amine catalyst (B'), and optional components such as the organotin compound (F), the organophosphorus compound (E), and the alkenyl group-containing silane compound (G), and other additives, and fully kneading the mixture under anhydrous conditions to uniformly disperse the components.

The resulting composition of the present invention exhibits excellent curability without detracting from the storage stability, good adhesion to glass and aluminum plates without using any primer, and sufficiently suppressed foaming. In addition to such features, the composition of the present invention can be provided with storage stability and curability corresponding to the environmental conditions under which the product is used by incorporating a particular amount of the tertiary amine catalyst of particular combination and a particular amount of organotin compound. The composition of the present invention having such advantageous features is quite adequate for use as a sealant for glass and aluminum plates.

EXAMPLES

The present invention is hereinafter described in detail by referring to Examples which by no means limit the scope of the invention.

First, Examples of the polyurethane composition containing a silane adduct are described.

<Production of Urethane Prepolymer>

500 g of polyoxypropylenediol (average molecular weight, 2000), 750 g of polyoxypropylenetriol (average molecular weight, 5000), and 214 g of 4,4'-diisocyanate phenylmethane (molecular weight, 250) were mixed (NCO/OH of the mixture, 1.8), and to this mixture was added 1460 g of dioctylphthalate. The mixture was stirred in nitrogen stream at 80° C. to react and to produce the urethane prepolymer containing 1.1% of isocyanate group.

<Synthesis of Silane Adduct>

<Adduct No. 1>

Into four-necked flask were added 150 g of XDI 3 mole adduct of trimethylolpropane (D-110N, manufactured by Takeda Chemical Industries, Ltd.; NCO, 11.7%) and 81 g of toluene. 18 g of 3-phenylaminopropyltrimethoxysilane (Y-9669, manufactured by Nippon Uniker) was added dropwise to the mixture while stirring in nitrogen stream to thereby obtain Adduct No. 1 containing 5.9% of isocyanate group (adduct content, 52.4%).

<Adduct No. 2>

Into four-necked flask were added 150 g of hydrogenated XDI (HXDI) 3 mole adduct of trimethylolpropane (D-120N, manufactured by Takeda Chemical Industries, Ltd.; NCO, 11.0%) and 106 g of toluene. 33 g of 3-phenylaminopropyltrimethoxysilane (Y-9669) was added dropwise to the mixture while stirring in nitrogen stream to thereby obtain Adduct No. 2 containing 3.8% of isocyanate group (adduct content, 50.3%).

<Adduct No. 3>

Into four-necked flask were added 336 g of HDI 3 mole adduct of trimethylolpropane (Coronate HL, manufactured by Nippon Polyurethane; NCO, 12.8%) and 168 g of toluene. 87 g of 3-phenylaminopropyltrimethoxysilane (Y-9669) was added dropwise to the mixture while stirring in nitrogen stream to thereby obtain Adduct No. 3 containing 4.9% of isocyanate group (adduct content, 57.4%).

<Adduct No. 4>

Into four-necked flask were added 168 g of HDI 3 mole adduct of trimethylolpropane (Coronate HL) and 142 g of toluene. 58.2 g of N,N-bis[(3-trimethoxysilyl)propyl]amine (A-1170, manufactured by Nippon Uniker) was added dropwise to the mixture while stirring in nitrogen stream to thereby obtain Adduct No. 4 containing 3.9% of isocyanate group (adduct content, 50.0%).

<Adduct No. 5>

Into four-necked flask were added 150 g of hydrogenated XDI 3 mole adduct of trimethylolpropane (D-120N) and 117 g of toluene. 43.8 g of N,N-bis[(3-trimethoxysilyl)propyl]amine (A-1170) was added dropwise to the mixture while stirring in nitrogen stream to thereby obtain Adduct No. 5 containing 3.5% of isocyanate group (adduct content, 50.3%).

<Adduct No. 6>

Into four-necked flask were added 150 g of XDI 3 mole adduct of trimethylolpropane (D-110N) and 93 g of toluene. 47.5 g of N,N-bis[(3-trimethoxysilyl)propyl]amine (A-1170) was added dropwise to the mixture while stirring in nitrogen stream to thereby obtain Adduct No. 6 containing 4.0% of isocyanate group (adduct content, 55.1%).

<Adduct No. 7>

Into four-necked flask were added 336 g of HDI 3 mole adduct of trimethylolpropane (Coronate HL) and 168 g of toluene. 174 g of 3-phenylaminopropyltrimethoxysilane (Y-9669) was added dropwise to the mixture while stirring in nitrogen stream to thereby obtain Adduct No. 7 containing 2.1% of isocyanate group (adduct content, 62.8%).

<Adduct No. 8>

Into four-necked flask was added 100 g of lysine triisocyanate (manufactured by Kyowa Hakko Kogyo Co., Ltd.; NCO, 47.1%), and 95.32 g of 3-phenylaminopropyltrimethoxysilane (Y-9669) was added dropwise to the mixture while stirring in nitrogen stream to thereby obtain Adduct No. 8 containing 16.1% of isocyanate group.

<Adduct No. 9>

Into four-necked flask was added 100 g of lysine diisocyanate (manufactured by Kyowa Hakko Kogyo Co., Ltd.; NCO, 39.6%), and 120.21 g of 3-phenylaminopropyltrimethoxysilane (Y-9669) was added dropwise to the mixture while stirring in nitrogen stream to thereby obtain Adduct No. 9 containing 18.5% of isocyanate group.

<Adduct No. 10>

Into four-necked flask was added 100 g of lysine triisocyanate (manufactured by Kyowa Hakko Kogyo Co., Ltd.; NCO, 47.1%), and 127.47 g of N,N-bis[(3-trimethoxysilyl)propyl]amine (A-1170) was added dropwise to the mixture while stirring in nitrogen stream to thereby obtain Adduct No. 10 containing 13.8% of isocyanate group.

<Adduct No. 11: biuret adduct>

Into four-necked flask was added 126.8 g of HDI biuret (Sumidur N-75, manufactured by Sumitomo Bayer Urethane Co., Ltd. (75% ethyl acetate solution of Mobay's Desmodur N-100); NCO, 17.49%) and 45 g of toluene. 90 g of N,N-bis[(3-trimethoxysilyl)propyl]amine (A-1170) was added dropwise to the mixture while stirring in nitrogen stream to thereby obtain Adduct No. 11 containing 5.6% of isocyanate group (adduct content, 70.7%).

<Adduct No. 12: isocyanurate adduct>

Into four-necked flask was added 95.6 g of HDI isocyanurate (Sumidur N-3500, manufactured by Sumitomo Bayer Urethane Co., Ltd. (=Mobay's Desmodur N-3300); NCO, 23.23%) and 45 g of toluene. 90 g of N,N-bis[(3-trimethoxysilyl)propyl]amine (A-1170) was added dropwise to the mixture while stirring in nitrogen stream to thereby obtain Adduct No. 12 containing 6.4% of isocyanate group (adduct content, 80.5%).

NCO/NH ratio, NCO%, and average number of NCO group and average number of alkoxy group in the adduct are shown in Table 1 for the adduct Nos. 1 to 12 synthesized as described above.

TABLE 1

| Adduct | 1 | 2 | 3 | 4 | 5 | 6 | 7 | 8 | 9 | 10 | 11 Biuret adduct | 12 Iso-cyanurate adduct |
|---|---|---|---|---|---|---|---|---|---|---|---|---|
| Raw material for addition reaction | | | | | | | | | | | | |
| Active hydrogen-containing component | TMP | TMP | TMP | TMP | TMP | TMP | TMP | — | — | — | — | — |
| Isocyanate component | XDI | HXDI | HDI | HDI | HXDI | XDI | HDI | | | | Biuret-HDI | Iso-cyanurate-HDI |
| Lysine component | | | | | | | | LTI | LDI | LTI | | |
| Secondary aminoalkoxysilane | Y-9669 | Y-9669 | | A-1170 | | Y-9669 | | Y-9669 | A-1170 | | A-1170 | |
| NCO/NH | 3/0.5 | 3/1 | 3/1 | 3/1 | 3/1 | 3/1 | 3/2 | 3/1 | 3/1 | 2/1 | 3/1 | 3/1 |
| NCO %* | 5.9 | 3.8 | 4.9 | 3.9 | 3.5 | 4.0 | 2.1 | 16.1 | 18.5 | 13.8 | 5.6 | 6.4 |
| Average number in one adduct molecule | | | | | | | | | | | | |
| NCO group | 2.50 | 2.00 | 2.00 | 2.00 | 2.00 | 2.00 | 1.00 | 2.00 | 1.50 | 2.00 | 2.00 | 2.00 |
| Alkoxy group bonded to silyl group | 1.50 | 3.00 | 3.00 | 6.00 | 6.00 | 6.00 | 6.00 | 3.00 | 1.50 | 3.00 | 6.00 | 6.00 |

$$*: \text{NCO\%} = \frac{[\text{amount of NCO in} \times \text{g of } \{(\text{reaction product between active hydrogen-containing component and isocyanate component}) \text{ or } (\text{lysine component})\} \times (1-\text{NH/NCO})]}{[\{(\text{amount of reaction product between active hydrogen-containing component and isocyanate component}) \text{ or } (\text{amount of lysine component})\} + (\text{amount of solvent}) + (\text{amount of aminoalkoxyilane})]} \times 100$$

TMP: trimethylolpropane
XDI: xylene diisocyanate
Y-9669: 3-phenylaminopropyltrimethoxysilane
HXDI: di(isocyanate methyl) cyclohexane
A-1170: N,N-bis [(3-trimethoxysilyl)propyl]amine
HDI: hexamethylene diisocyanate
LTI: lysine triisocyanate
LDI: lysine diisocyanate Polyurethane compositions were prepared by using adduct Nos. 1 to 12 obtained as described above.

Examples 1 to 4

The urethane prepolymer prepared as described above; the adduct No. 1 or 2; bis(2-dimethylaminoethyl)ether (BL-19, manufactured by Sankyo Air Products) as the tertiary amine catalyst; dioctyl tin laurate; triphenylphosphine; and fully dried carbon black were admixed in accordance with the compositions shown in Table 2, and the components were mixed in the absence of water to obtain the polyurethane compositions.

Comparative Examples 1 to 14

The procedure of Examples 1 to 4 was repeated except that the adduct No. 3, 4, 5, 6, or 7 or 3-phenylaminopropyltrimethoxysilane (Y-9669) was used instead of the adduct No. 1 or 2 in the composition shown in Table 2 to obtain the polyurethane compositions.

Examples 5 to 8

The procedure of Examples 1 to 4 was repeated except that the adduct No. 8 or 9 was used instead of the adduct No. 1 or 2 at the content shown in Table 2 to obtain the polyurethane compositions.

Comparative Examples 15 to 20

The procedure of Examples 1 to 4 was repeated except that the adduct No. 10, 11 or 12 was used instead of the adduct No. 1 or 2 at the content shown in Table 2 to obtain the polyurethane compositions.

The thus obtained polyurethane compositions were evaluated for curing time, adhesion, foaming resistance, strength, elongation, and storage stability by the procedure as described below. The results are shown in Table 2.

(1) Curing Time

The polyurethane compositions obtained as described above were evaluated for tack free time in an atmosphere of 20° C., and 65% RH. The results are shown in Table 2.

(2) Adhesion Test

Test samples were prepared by coating a glass plate, a coated steel plate, and an aluminum plate with the polyurethane composition to a thickness of 3 mm. The test samples were left for 3 days in an atmosphere of 20° C. and 65% RH, and subjected to manual peel test after making cuts with a knife.

The test samples were further immersed in warm water at 60° C. or in 50% window washer solution for 10 days, and manual peel test was conducted by the same procedure. In Table 2, ○ indicates cohesive failure at the layer of the composition with no debonding at the interface between the composition and the glass, and x indicates the debonding at least at some parts of the test sample.

(3) Foaming Resistance Test

A glass plate and a coated steel plate were coated with the polyurethane composition to a thickness of 3 mm. The plates were left for 3 days in an atmosphere of 20° C. and 65% RH, and immersed in warm water at 40° C. for 3 days to evaluate foaming inside of the composition or at the interface between the composition and the glass, and manual peel test was conducted by the same procedure. In Table 2, ○ indicates that no foaming was observed inside of the composition and at the interface between the composition and the glass after the foaming test, and x indicates that foaming was observed inside of the composition and at the interface between the composition and the glass.

(4) Strength (Tb) and Elongation (Eb)

The polyurethane compositions were allowed to cure for 7 days in an atmosphere of 20° C. and 65% RH, and then evaluated in accordance with JIS K6251.

(5) Storage Stability Test

The polyurethane compositions were stored at 50° C. for 2 weeks in a drum, and then left either in an atmosphere of 20° C. and 65% RH for 3 days, or in 50% window washer solution for 10 days. Adhesion with a coated steel plate and an aluminum plate was then evaluated as in the case of the adhesion test as described above.

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| Urethane prepolymer | 100 | 100 | 100 | 100 | 100 | 100 | 100 | 100 |
| Adduct No. 1(solid content, 52.4%) | 8.7 | 1.8 | | | | | | |
| Adduct No. 2(solid content, 50.3%) | | | 8.7 | 0.9 | | | | |
| Adduct No. 3(solid content, 57.4%) | | | | | 6.6 | 3.3 | 1.65 | 0.66 |
| BL-19 | 0.05 | 0.05 | 0.05 | 0.05 | 0.05 | 0.05 | 0.05 | 0.05 |
| Dioctyl tin dilaurate | 0.02 | 0.02 | 0.02 | 0.02 | 0.02 | 0.02 | 0.02 | 0.02 |
| Triphenylphosphine | 0.1 | 0.1 | 0.1 | 0.1 | 0.1 | 0.1 | 0.1 | 0.1 |
| Carbon black | 102 | 102 | 102 | 102 | 102 | 102 | 102 | 102 |
| Adduct content (%) of polyurethane composition | 2.16 | 0.46 | 2.08 | 0.22 | 1.82 | 0.92 | 0.47 | 0.19 |
| Curing time (min.) | 32 | 33 | 32 | 34 | 32 | 30 | 33 | 30 |
| Adhesion to glass | | | | | | | | |
| at 20° C. and 65% RH for 3 days | ○ | ○ | ○ | ○ | ○ | ○ | ○ | ○ |
| in water of 60° C. for 10 days | ○ | ○ | ○ | ○ | ○ | ○ | ○ | ○ |
| in 50% window washer solution for 10 days | ○ | ○ | ○ | ○ | ○ | ○ | ○ | ○ |
| Adhesion to coated steel plate | | | | | | | | |
| at 20° C. and 65% RH for 3 days | ○ | ○ | ○ | ○ | ○ | ○ | ○ | ○ |
| in water of 60° C. for 10 days | ○ | ○ | ○ | ○ | ○ | ○ | ○ | ○ |
| in 50% window washer solution for 10 days | ○ | ○ | ○ | ○ | ○ | ○ | ○ | ○ |
| Adhesion to aluminium plate | | | | | | | | |
| at 20° C. and 65% RH for 3 days | ○ | ○ | ○ | ○ | ○ | x | x | x |
| in water of 60° C. for 10 days | ○ | ○ | ○ | ○ | ○ | ○ | x | x |
| in 50% window washer solution for 10 days | ○ | ○ | ○ | ○ | x | x | x | x |
| Foaming resistance | ○ | ○ | ○ | ○ | ○ | ○ | ○ | ○ |
| Adhesion after accelerated storage (50° C. for 2 weeks) of the uncured product | | | | | | | | |
| Adhesion to coated steel plate | | | | | | | | |
| at 20° C. and 65% RH for 3 days | ○ | ○ | ○ | ○ | ○ | ○ | ○ | ○ |
| in 50% window washer solution for 10 days | ○ | ○ | ○ | ○ | ○ | ○ | ○ | ○ |
| Adhesion to aluminium plate | | | | | | | | |
| at 20° C. and 65% RH for 3 days | ○ | ○ | ○ | ○ | ○ | x | x | x |
| in 50% window washer solution for 10 days | ○ | ○ | ○ | ○ | x | x | x | x |
| Physical properties of the cured product (at 20° C. and 65% RH for 7 days) | | | | | | | | |
| Strength, Tb (Mpa) | 6.0 | 6.8 | 5.9 | 6.6 | 6.0 | 6.1 | 6.8 | 7.0 |
| Elongation, Eb (%) | 200 | 340 | 190 | 390 | 220 | 270 | 350 | 400 |

|  | Comparative Example | | | | | | | | | |
| --- | --- | --- | --- | --- | --- | --- | --- | --- | --- | --- |
|  | 5 | 6 | 7 | 8 | 9 | 10 | 11 | 12 | 13 | 14 |
| Urethane prepolymer | 100 | 100 | 100 | 100 | 100 | 100 | 100 | 100 | 100 | 100 |
| Adduct No. 4(solid content, 50.0%) | 5.8 | 0.5 | 0.6 | | | | | | | |
| Adduct No. 5(solid content, 50.3%) | | | | 5.8 | 1.5 | | | | | |
| Adduct No. 6(solid content, 55.1%) | | | | | | 6.2 | 1.2 | | | |
| Adduct No. 7(solid content, 62.8%) | | | | | | | | 3.9 | 1.4 | 0.3 |
| BL-19 | 0.05 | 0.05 | 0.05 | 0.05 | 0.05 | 0.05 | 0.05 | 0.05 | 0.05 | 0.05 |

TABLE 2-continued

| | | | | | | | | | | |
|---|---|---|---|---|---|---|---|---|---|---|
| Dioctyl tin dilaurate | 0.2 | 0.2 | 0.2 | 0.2 | 0.2 | 0.2 | 0.2 | 0.2 | 0.2 | 0.2 |
| Triphenylphosphine | 0.1 | 0.1 | 0.1 | 0.1 | 0.1 | 0.1 | 0.1 | 0.1 | 0.1 | 0.1 |
| Carbon black | 102 | 102 | 102 | 102 | 102 | 102 | 102 | 102 | 102 | 102 |
| Adduct content (%) of polyurethane composition | 1.39 | 0.37 | 0.15 | 1.40 | 0.37 | 1.64 | 0.32 | 1.19 | 0.69 | 0.15 |
| Curing time (min.) | 33 | 32 | 32 | 33 | 32 | 34 | 33 | 30 | 65 | 35 |
| Adhesion to glass | | | | | | | | | | |
| at 20° C. and 65% RH for 3 days | ○ | ○ | ○ | ○ | ○ | ○ | ○ | ○ | ○ | x |
| in water of 60° C. for 10 days | ○ | ○ | ○ | ○ | ○ | ○ | ○ | ○ | ○ | x |
| in 50% window washer solution for 10 days | ○ | ○ | ○ | ○ | ○ | ○ | ○ | ○ | ○ | x |
| Adhesion to coated steel plate | | | | | | | | | | |
| at 20° C. and 65% RH for 3 days | ○ | ○ | ○ | ○ | ○ | ○ | ○ | x | x | x |
| in water of 60° C. for 10 days | ○ | ○ | ○ | ○ | ○ | ○ | ○ | ○ | ○ | x |
| in 50% window washer solution for 10 days | ○ | ○ | ○ | ○ | ○ | ○ | ○ | x | x | x |
| Adhesion to aluminium plate | | | | | | | | | | |
| at 20° C. and 65% RH for 3 days | ○ | x | x | ○ | ○ | ○ | ○ | ○ | x | x |
| in water of 60° C. for 10 days | ○ | ○ | x | ○ | ○ | ○ | ○ | ○ | ○ | x |
| in 50% window washer solution for 10 days | x | x | x | ○ | ○ | ○ | ○ | x | x | x |
| Foaming resistance | ○ | ○ | ○ | ○ | ○ | ○ | ○ | x | ○ | ○ |
| Adhesion after accelerated storage (50° C. for 2 weeks) of the uncured product | | | | | | | | | | |
| Adhesion to coated steel plate | | | | | | | | | | |
| at 20° C. and 65% RH for 3 days | ○ | x | x | ○ | x | ○ | x | x | x | x |
| in 50% window washer solution for 10 days | x | x | x | x | x | x | x | x | x | x |
| Adhesion to aluminium plate | | | | | | | | | | |
| at 20° C. and 65% RH for 3 days | ○ | x | x | ○ | x | ○ | x | ○ | x | x |
| in 50% window washer solution for 10 days | x | x | x | x | x | x | x | x | x | x |
| Physical properties of the cured product (at 20° C. and 65% RH for 7 days) | | | | | | | | | | |
| Strength, Tb (Mpa) | 6.5 | 7.0 | 7.2 | 6.4 | 7.1 | 6.6 | 7.1 | 6.1 | 6.8 | 6.9 |
| Elongation, Eb (%) | 220 | 350 | 480 | 230 | 350 | 210 | 370 | 210 | 320 | 450 |

| | Example | | | | Comparative Example | | | | | |
|---|---|---|---|---|---|---|---|---|---|---|
| | 5 | 6 | 7 | 8 | 15 | 16 | 17 | 18 | 19 | 20 |
| Urethane prepolymer | 100 | 100 | 100 | 100 | 100 | 100 | 100 | 100 | 100 | 100 |
| Adduct No. 8(solid content, 100.0%) | 0.79 | | 3.0 | | | | | | | |
| Adduct No. 9(solid content, 100.0%) | | 0.79 | | 3.0 | | | | | | |
| Adduct No. 10(solid content, 100.0%) | | | | | 0.79 | 3.0 | | | | |
| Adduct No. 11(solid content, 70.7%) | | | | | | | 0.42 | | 4.2 | |
| Adduct No. 12(solid content, 80.5%) | | | | | | | | 0.37 | | 3.7 |
| BL-19 | 0.05 | 0.05 | 0.05 | 0.05 | 0.05 | 0.05 | 0.05 | 0.05 | 0.05 | 0.05 |
| Dioctyl tin dilaurate | 0.02 | 0.02 | 0.02 | 0.02 | 0.02 | 0.02 | 0.02 | 0.02 | 0.02 | 0.02 |
| Triphenylphosphine | 0.1 | 0.1 | 0.1 | 0.1 | 0.1 | 0.1 | 0.1 | 0.1 | 0.1 | 0.1 |
| Carbon black | 102 | 102 | 102 | 102 | 102 | 102 | 102 | 102 | 102 | 102 |
| Adduct content (%) of polyurethane composition | 0.39 | 0.39 | 1.5 | 1.5 | 0.39 | 1.5 | 0.15 | 0.15 | 1.5 | 1.5 |
| Curing time (min.) | 33 | 34 | 33 | 33 | 33 | 34 | 33 | 35 | 32 | 33 |
| Adhesion to glass | | | | | | | | | | |
| at 20° C. and 65% RH for 3 days | ○ | ○ | ○ | ○ | ○ | ○ | x | x | ○ | ○ |
| in water of 60° C. for 10 days | ○ | ○ | ○ | ○ | ○ | ○ | ○ | ○ | ○ | ○ |
| in 50% window washer solution for 10 days | ○ | ○ | ○ | ○ | ○ | ○ | x | x | ○ | ○ |
| Adhesion to coated steel plate | | | | | | | | | | |
| at 20° C. and 65% RH for 3 days | ○ | ○ | ○ | ○ | ○ | ○ | x | x | ○ | ○ |
| in water of 60° C. for 10 days | ○ | ○ | ○ | ○ | ○ | ○ | x | x | ○ | ○ |
| in 50% window washer solution for 10 days | ○ | ○ | ○ | ○ | ○ | ○ | x | x | x | x |
| Adhesion to aluminium plate | | | | | | | | | | |
| at 20° C. and 65% RH for 3 days | ○ | ○ | ○ | ○ | ○ | ○ | x | x | ○ | ○ |
| in water of 60° C. for 10 days | ○ | ○ | ○ | ○ | ○ | ○ | x | x | ○ | ○ |
| in 50% window washer solution for 10 days | ○ | ○ | ○ | ○ | ○ | ○ | x | x | x | x |

TABLE 2-continued

| | | | | | | | | | | |
|---|---|---|---|---|---|---|---|---|---|---|
| Foaming resistance | ○ | ○ | ○ | ○ | ○ | ○ | ○ | ○ | ○ | ○ |
| Adhesion after accelerated storage (50° C. for 2 weeks) of the uncured product | | | | | | | | | | |
| Adhesion to coated steel plate | | | | | | | | | | |
| at 20° C. and 65% RH for 3 days | ○ | ○ | ○ | ○ | ○ | ○ | x | x | ○ | ○ |
| in 50% window washer solution for 10 days | ○ | ○ | ○ | ○ | x | x | x | x | x | x |
| Adhesion to aluminium plate | | | | | | | | | | |
| at 20° C. and 65% RH for 3 days | ○ | ○ | ○ | ○ | ○ | ○ | x | x | ○ | ○ |
| in 50% window washer solution for 10 days | ○ | ○ | ○ | ○ | x | x | x | x | x | x |
| Physical properties of the cured product (at 20° C. and 6.5% RH for 7 days) | | | | | | | | | | |
| Strength, Tb (Mpa) | 6.7 | 6.5 | 5.8 | 5.9 | 6.4 | 5.4 | 6.4 | 6.6 | 5.0 | 4.8 |
| Elongation, Eb (%) | 460 | 490 | 300 | 350 | 430 | 210 | 440 | 460 | 200 | 200 |

In the table, the content is shown in parts by weight.
Amount of the adduct Nos. 1 to 3 is shown in parts by weight including the solvent.
Amount of the adduct Nos. 4 to 7 is shown in parts by weight including the solvent.
Amount of the adduct Nos. 8 to 12 is shown in parts by weight including the solvent.
Adduct content of the polyurethane composition (%) = (solid content of adduct/solid content of the polyurethane composition × 100)
BL-19: bis(2-dimethylaminoethyl)ether Comparative Examples 1 to 4 produced by using adduct No. 3 prepared by using HDI for the isocyanate component exhibited insufficient adhesion to the aluminum plate as well as insufficient storage stability. Comparative Examples 8 to 11 produced by using adduct Nos. 5 and 6 produced by using XDI or hydrogenated XDI for the isocyanate component but using a secondary aminoalkoxysilane having no aromatic ring exhibited insufficient storage stability. Comparative Examples 15 and 16 produced by using adduct No. 10 prepared by using the lysine component but using a secondary aminoalkoxysilane having no aromatic ring also exhibited insufficient storage stability. Comparison between the compositions of the present invention with the compositions of prepared by using biuret adduct or isocyanurate adduct (Comparative Examples 17 to 20) reveals excellent adhesion as well as excellent storage stability of the compositions of the present invention.

Next, physical properties of the polyurethane compositions containing an alkenyl group-containing silane adduct (G) blended therein were compared.

Examples 9 to 11

The urethane prepolymer; the adduct No. 1; 3-methacryloxypropyltrimethoxysilane (A-174) as the alkenyl group-containing silane adduct; dimorpholinodiethylether (DMDEE, manufactured by Huntsman) and N,N-dimethylaminoethylmorpholine (X-DM, manufactured by Sankyo Air Products) as the tertiary amine catalyst; dioctyl tin laurate; triphenylphosphine; and fully dried carbon black were admixed in accordance with the compositions shown in Table 3, and the components were mixed in the absence of water to obtain the polyurethane compositions. Comparative Examples 21 to 28

The procedure of Example 9 was repeated except that the composition was produced by replacing the adduct No. 1 with the adduct No. 4 or by omittnig the use of the adduct; and 3-methacryloxypropyltrimethoxysilane (A-174), vinylmethoxysilane (A-171), and/or N,N-bis[(3-trimethoxysilyl)propyl]amine (A-1170) were blended at the content shown in Table 3 to obtain the polyurethane compositions.

The thus obtained polyurethane compositions were evaluated for curing time, adhesion, foaming resistance, strength, elongation, and storage stability by repeating the procedure of Example 1. The results are shown in Table 4.

TABLE 3

| | Example | | | Comparative Example | | | | | | | |
|---|---|---|---|---|---|---|---|---|---|---|---|
| | 9 | 10 | 11 | 21 | 22 | 23 | 24 | 25 | 26 | 27 | 28 |
| Urethane prepolymer | 100 | 100 | 100 | 100 | 100 | 100 | 100 | 100 | 100 | 100 | 100 |
| Adduct No. 1(solid content, 52.4%) | 0.4 | 1.5 | 1.5 | | | | | | | | |
| Adduct No. 4(solid content, 50.0%) | | | | 0.4 | 1.5 | 1.5 | 0.4 | 1.5 | 1.5 | | |
| A-174 | 0.5 | 0.5 | 1.5 | 0.5 | 0.5 | 1.5 | | | | | |
| A-171 | | | | | | | 0.5 | 0.5 | 1.5 | | 1.5 |
| A-1170 | | | | | | | | | | 1.5 | 1.5 |
| DMDEE | 0.1 | 0.1 | 0.1 | 0.07 | 0.07 | 0.07 | 0.07 | 0.07 | 0.07 | 0.07 | 0.07 |
| X-DM | 0.1 | 0.1 | 0.1 | 0.7 | 0.7 | 0.7 | 0.7 | 0.7 | 0.7 | 0.7 | 0.7 |
| Dioctyl tin dilaurate | 0.02 | 0.02 | 0.02 | 0.02 | 0.02 | 0.02 | 0.02 | 0.02 | 0.02 | 0.02 | 0.02 |
| Carbon black | 102 | 102 | 102 | 102 | 102 | 102 | 102 | 102 | 102 | 102 | 102 |
| Adduct content (%) of polyurethane composition | 0.10 | 0.39 | 0.39 | 0.10 | 0.37 | 0.37 | 0.10 | 0.37 | 0.37 | 0.74 | 0.73 |

TABLE 3-continued

|  | Example | | | Comparative Example | | | | | | | |
|---|---|---|---|---|---|---|---|---|---|---|---|
|  | 9 | 10 | 11 | 21 | 22 | 23 | 24 | 25 | 26 | 27 | 28 |

In the table, the content is shown in parts by weight.
Amount of the adduct No. 4 is shown in parts by weight including the solvent.
Adduct content of the polyurethane composition (%) = (solid content of adduct/solid content of the polyurethane composition × 100)
* Comparative Examples 27 and 28: concentration of compounds
A-174: 3-methacryloxyoxpropyltrimethoxysilane
A-171: vinylmethoxysilane
A-1170: N,N-bis[(3-trimethoxysilyl)propyl]amine
DMDEE: dimorpholinodiethylether
X-DM: N,N-dimethylaminoethylmorpholine

TABLE 4

|  | Example | | | Comparative Example | | | | | | | |
|---|---|---|---|---|---|---|---|---|---|---|---|
|  | 9 | 10 | 11 | 21 | 22 | 23 | 24 | 25 | 26 | 27 | 28 |
| Curing time (min.) | 32 | 33 | 35 | 31 | 31 | 30 | 32 | 31 | 30 | 65 | 63 |
| Adhesion to glass | | | | | | | | | | | |
| at 20° C. and 65% RH for 3 days | ○ | ○ | ○ | ○ | ○ | ○ | ○ | ○ | ○ | x | x |
| in water of 60° C. for 10 days | ○ | ○ | ○ | ○ | ○ | ○ | ○ | ○ | ○ | ○ | ○ |
| in 50% window washer solution for 10 days | ○ | ○ | ○ | ○ | ○ | ○ | ○ | ○ | ○ | x | x |
| Adhesion to coated steel plate | | | | | | | | | | | |
| at 20° C. and 65% RH for 3 days | ○ | ○ | ○ | ○ | ○ | ○ | ○ | ○ | ○ | x | x |
| in water of 60° C. for 10 days | ○ | ○ | ○ | ○ | ○ | ○ | ○ | ○ | ○ | x | x |
| in 50% window washer solution for 10 days | ○ | ○ | ○ | ○ | ○ | ○ | ○ | ○ | ○ | x | x |
| Adhesion to aluminium plate | | | | | | | | | | | |
| at 20° C. and 65% RH for 3 days | ○ | ○ | ○ | x | x | x | x | x | x | x | x |
| in water of 60° C. for 10 days | ○ | ○ | ○ | x | ○ | ○ | x | ○ | ○ | x | x |
| in 50% window washer solution for 10 days | ○ | ○ | ○ | x | x | x | x | x | x | x | x |
| Foaming resistance | ○ | ○ | ○ | ○ | ○ | ○ | ○ | ○ | ○ | ○ | ○ |
| Adhesion after accelerated storage (50° C. for 2 weeks) of the uncured product | | | | | | | | | | | |
| Adhesion to coated steel plate | | | | | | | | | | | |
| at 20° C. and 65% RH for 3 days | ○ | ○ | ○ | x | x | x | x | x | x | x | x |
| in 50% window washer solution for 10 days | ○ | ○ | ○ | x | x | x | x | x | x | x | x |
| Adhesion to aluminium plate | | | | | | | | | | | |
| at 20° C. and 65% RH for 3 days | ○ | ○ | ○ | x | x | x | x | x | x | x | x |
| in 50% window washer solution for 10 days | ○ | ○ | ○ | x | x | x | x | x | x | x | x |
| Physical properties of the cured product (at 20° C. and 65% RH for 7 days) | | | | | | | | | | | |
| Strength, Tb (Mpa) | 5.8 | 5.5 | 6.1 | 5.5 | 5.7 | 5.9 | 5.6 | 5.8 | 6.0 | 5.0 | 5.7 |
| Elongation, Eb (%) | 610 | 580 | 620 | 590 | 540 | 600 | 600 | 550 | 610 | 300 | 540 |

The results demonstrate that the compositions of Examples 9 to 11 have physical properties equivalent to those of Examples 1 to 4. The compositions of the Examples 9 to 11 also exhibits improved elongation.

Next, effect of the catalyst employed were examined.

Examples 12 to 14

To the mixed solution of the urethane prepolymer (98.5 g) prepared as described above and the adduct No. 1 (1.5 g) were added dimorpholinodiethylether (DMDEE), N,N-dimethylaminoethylmorpholine (X-DM) and/or bis(2-dimethylaminoethyl)ether (BL-19); dioctyl tin laurate; and triphenylphosphine in accordance with the compositions shown in Table 5, and the components were mixed in the absence of water to obtain the polyurethane compositions.

Comparative Examples 29 to 39

To the mixed solution of the urethane prepolymer prepared as described above and the adduct No. 1 were added dimorpholinodiethylether (DMDEE), N,N-dimethylaminoethylmorpholine (X-DM), bis(2-dimethylaminoethyl)ether (BL-19) and/or 1,8-diazabicycloundecane (DABCO DC-2, also referred to as DABCO series) (manufactured by Air Products and Chemicals K.K.); dioctyl tin laurate; and triphenylphosphine in accordance with the compositions shown in Table 5, and the components were mixed in the absence of water to obtain the polyurethane compositions.

The thus obtained polyurethane compositions were evaluated for bead forming property, storage stability, curing time, adhesion after accelerated curing, adhesion in the absence of the primer by the procedure as described below.

(6) Bead Forming Test

Figure 3:
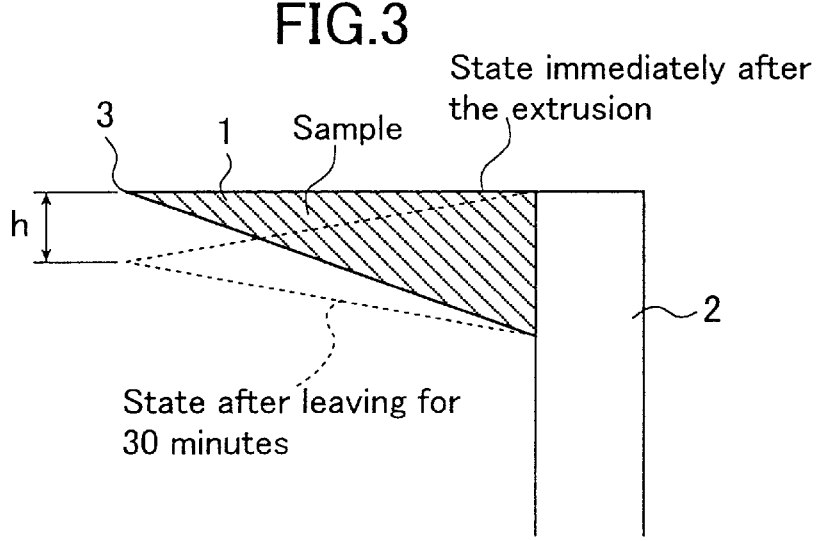
FIG. 3 is a schematic view of the sample which has been left in an atmosphere of 20±2° C. and 65% RH for 30 minutes. The distance of the vertex movement and distance h of sagging are also indicated.

The polyurethane composition as produced and the polyurethane composition after standing at 50° C. for 2 weeks (after aging) were extruded in an atmosphere of 20° C., 65% RH as shown in FIG. 3 so that the cross section of the extruded polyurethane composition 1 is a right triangle having a base of 8 mm and a height of 12 mm, and the base is in contact with the aluminum plate 2. The aluminum plate 2 is raised immediately after the extrusion, so that the hypotenuse of the right triangle is on the lower side of the triangle. The distance of the vertex movement from the vertex 3 of the right triangle immediately after the extrusion to the vertex 3 of the right triangle after 30 minutes was observed. The results are shown in Table 5.

In Table 5, ○ indicates that the distance of movement was 0 mm (i.e. no movement), Δ indicates that the movement was less than 3 mm, and x indicates that the movement was 3 mm or longer.

(7) Test for Storage Stability of Viscosity

The polyurethane compositions were stored at 50° C. for 2 weeks in a drum and alteration in the viscosity was observed to evaluate storage stability in the absence of minute moisture. In Table 5, ○ indicates alteration of less than ±10% (of the initial viscosity) and Δ indicates alteration of ±10% or more (of the initial viscosity).

(8) Test for Stability of Curability in Tube

The polyurethane compositions were filled in a teflon tube and stored in an oven of 70° C. for 1 week. The tube was torn to observe the state of curing (thickness of the cured film) to thereby evaluate storage stability in the presence of minute moisture. In Table 5, ○ indicates that the thickness of the cured film was less than 0.5 mm, Δ indicates that the thickness of the cured film was 0.5 to less than 1.0 mm, and x indicates that the thickness of the cured film was 1.0 mm or more.

(9) Curing Time

The polyurethane compositions were stored at 50° C. for 2 weeks in a drum and tack free time was measured. In Table 5, ○ indicates that the tack free time was within less than ±5 minutes of the tack free time before the aging, and x indicates that the tack free time was ±5 minutes or more of the tack free time before the aging.

(10) Test for Adhesion after Accelerated Curing

A glass plate coated with an isocyanate primer (MS-90, manufactured by The Yokohama Rubber Co., Ltd.) to a thickness of 5 μm was further coated with the composition to a thickness of 3 mm, and the plate was allowed to stand in an atmosphere of 20° C. and 65% RH for 3 hours and immersed in a warm water of 40° C. for 3 days. The test sample was subjected to manual peel test after making cuts with a knife. In Table 5, CF designates cohesive failure at the layer of the composition and PS designates debonding at the interface between the layer of the composition and the primer layer.

(11) Test for Adhesion in the Absence of the Primer

The composition was coated on a coated steel plate to a thickness of 3 mm, and the plate was allowed to stand in an atmosphere of 20° C. and 65% RH for 3 hours. The test sample was subjected to manual peel test after making cuts with a knife. In Table 5, CF designates cohesive failure at the layer of the composition and AF designates debonding at the interface between the layer of the composition and the coating of the coated steel plate.

TABLE 5

|  | Example | | | Comparative Example | | | | | | | | | | |
| --- | --- | --- | --- | --- | --- | --- | --- | --- | --- | --- | --- | --- | --- | --- |
|  | 12 | 13 | 14 | 29 | 30 | 31 | 32 | 33 | 34 | 35 | 36 | 37 | 38 | 39 |
| Urethane prepolymer plus adduct 1 | 100 | 100 | 100 | 100 | 100 | 100 | 100 | 100 | 100 | 100 | 100 | 100 | 100 | 100 |
| DMDEE | 0.05 | 0.1 |  |  |  |  | 0.03 | 0.1 | 0.15 | 0.2 | 0.2 |  |  |  |
| X-DM | 2.0 | 0.5 |  | 3.0 | 3.0 | 2.7 | 0.5 | 0.05 |  |  |  |  |  |  |
| BL-19 |  |  | 0.05 |  |  |  |  |  |  |  |  | 0.05 | 0.5 |  |
| DABCO catalyst |  |  |  |  |  |  |  |  |  |  |  |  | 0.05 | 0.2 |
| Dioctyl tin laurate | 0.01 | 0.01 | 0.01 |  | 0.01 | 0.01 |  |  | 0.01 | 0.01 |  |  | 0.01 |  |
| Triphenylphosphine |  |  | 0.1 |  |  |  |  |  |  |  |  |  |  |  |
| Bead forming property (initial) | ○ | ○ | ○ | Δ | Δ | Δ | ○ | ○ | ○ | ○ | ○ | ○ | ○ | ○ |
| Bead forming property (after aging) | ○ | ○ | ○ | x | x | x | ○ | ○ | ○ | ○ | ○ | ○ | Δ | Δ |
| Storage stability of viscosity | ○ | ○ | ○ | Δ | Δ | Δ | ○ | ○ | ○ | ○ | ○ | ○ | ○ | ○ |
| Curability in tube | ○ | ○ | ○ | x | x | x | ○ | ○ | ○ | ○ | Δ | Δ | Δ | x |
| Curing time | ○ | ○ | ○ | ○ | ○ | ○ | ○ | ○ | ○ | ○ | x | x | ○ | ○ |
| Adhesion after accelerated curing | CF | CF | CF | CF | CF | CF | CF | PS | PS | PS | CF | CF | PS | PS |
| Adhesion to coated plate (in the absence of primer) | CF | CF | CF | AF | CF | CF | AF | CF | CF | AF | AF | CF | CF | CF |
| General evaluation | ○ | ○ | ○ | x | x | x | x | x | x | x | x | x | x | x |

DMDEE: dimorpholinodiethylether
X-DM: N,N-dimethylaminoethylmorpholine
BL-19: bis (2-dimethylaminoethyl) ether
DABCO catalyst: 1,8-diazabicycloundecane (DABCO DC-2)

Comparative Examples 29 to 31 wherein X-DM alone is blended as the tertiary amine catalyst suffer from particularly inferior formability and curability, and Comparative Examples 34 and 35 wherein DMDEE alone is blended as the tertiary amine catalyst suffer from insufficient adhesion. The results also reveal that, even if these catalysts were used in combination, adhesion of desired level is not realized unless the catalysts are used at a particular blend ratio. When BL-19 alone is used, curability can be improved by simultaneously using triphenylphosphine. The results also reveal that, when no primer is used, adhesion of the desired level is not realized unless dioctyl tin laurate is simultaneously used. Also demonstrated is the superiority of the composition of the present invention in comparison with those containing the DABCO catalyst which is not within the scope of the tertiary amine catalyst of the present invention.

Next, examples of sealants are described. Examples 15 to 16, Comparative Example 40, and Reference Examples 1 to 3

<Preparation of Sealant Composition>

A polyether triol having an average molecular weight of about 5000 and a polyether diol having an average molecular weight of about 2000 were mixed at a weight ratio of 6/4, and the mixture was dehydrated at 110° C. To this dehydrated mixture was added molten 4,4'-diphenylmethanediisocyanate in an amount such that NCO group/OH group is at a ratio in equivalent of 1.7, and the mixture was stirred at 80° C. for 36 hours while the atmosphere was purged with nitrogen. Urethane prepolymer (A) was thereby produced.

To 100 parts of the thus obtained urethane prepolymer (A) were added 30 parts by weight of a plasticizer (dioctyl phthalate), 70 parts by weight of carbon black, and 30 parts by weight of heavy calcium carbonate (average particle diameter, 2.0 μm), and the mixture was agitated under vacuum in a blender for 1 hour. A stabilizer (diethyl malonate) was added and the agitation was continued for another 10 minutes to obtain a preliminary composition.

To 100 parts by weight the thus obtained preliminary composition were added dimorpholinodiethylether (DMDEE) (manufactured by Huntsman) and N,N'-dimethylaminoethylmorpholine (X-DM) as the catalysts in the amounts shown in Table 6 to thereby obtain the sealant composition.

The resulting sealant compositions were evaluated for curability under high temperature, high humidity conditions and sagging. The results are shown in Table 6.

<Curability under High temperature, High Humidity Conditions>

The sealant composition was coated on a substrate adapted for use in the evaluation of high temperature, high humidity curability (glass plate or the like coated with a primer). The sample was allowed to stand at a temperature of 20° C. and a relative humidity (RH) of 60% for 3 hours, and in a warm water of 40° C. for 24 hours for curing. The coated composition was peeled off the plate at 180° to thereby observe the state of failure. In the Table, CF designates cohesive failure and PS designates debonding at the interface between the primer and the sealant.

<Sagging>

A test similar to the bead forming test (6) as described above was conducted.

The sagging was examined by evaluating form retention of the sealant composition for the sample wherein the sealant composition has been coated in the form of a bead.

Figure 2:
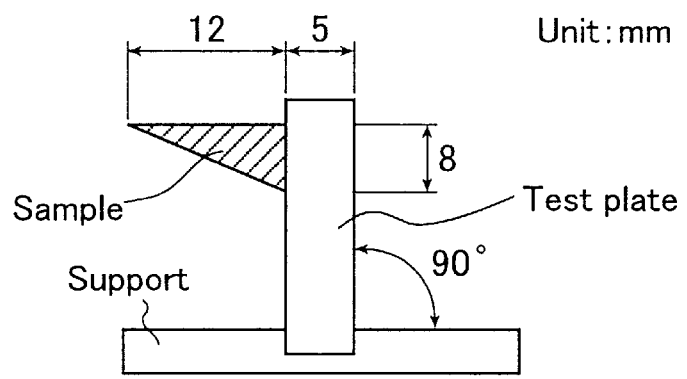
FIG. 2 is a schematic view of the state wherein the test plate immediately after the extrusion of the composition is secured to a support and raised at an angle of 90°.

The sealant composition was extruded on a glass plate so that the cross section of the extruded bead is a right triangle having a base of 8 mm and a height of 10 mm (FIG. 1). Immediately after the extrusion, the test plate is secured to a support and raised at an angle of 90° (FIG. 2). The sample is left to stand at 20±2° C. and 65% RH for 30 minutes, and the distance of the vertex movement and the distance of sagging (maximum distance, h) were measured (FIG. 3).

The distance h of less than 2 mm is evaluated as fair (indicated by ○ in the table), and the distance h of 2 mm or more is evaluated as poor (indicated by x in the table)

TABLE 6

| (parts by weight) | Ex. 15 | Ex. 16 | Ref. Ex. 1 | Ref. Ex. 2 | Ref. Ex. 3 | Comp. Ex. 40 |
|---|---|---|---|---|---|---|
| Preliminary composition | 100 | 100 | 100 | 100 | 100 | 100 |
| DAMDEE | 0.05 | 0.1 | 0.03 | 0.15 | 0.17 | 0.2 |
| X-DM | 2 | 0.5 | 2.7 | 0.05 | 0.01 | 0 |
| High temp., high humid. curability | CF | CF | CF | PS | PS | PS |
| Sagging | ○ | ○ | x | ○ | ○ | ○ |

As demonstrated above, the polyurethane composition of the present invention containing dimorpholinodiethylether and N,N-dimethylaminoethylmorpholine as the catalysts cures at a high speed, and DAMDEE is required only at a content of about 0.05 parts by weight per 100 parts by weight of the preliminary mixture as shown in Table 6. Since the adhesion under high temperature, high humidity conditions is attained by the simultaneous incorporation of DAMDEE and X-DM, DAMDEE can be used at a small amount, and this realizes stable adhesion without causing any adhesion failure even if the curing environment underwent a drastic change as in the case of high temperature, high humidity conditions. In particular, the polyurethane composition of the present invention will be a sealing material exhibiting good adhesion under high temperature, high humidity conditions as well as good form retention when it contains the catalysts at the contents of the Examples.

As described above, the moisture curable polyurethane composition of the present invention exhibits excellent adhesion to glass, metal, plastic, and coated steel plates, and in particular, excellent adhesion to glass and aluminum as well as good curability and storage stability in the absence of the primer. In addition, the moisture curable polyurethane composition of the present invention can be provided with improved elongation without detracting from such favorable properties.

The composition of the present invention, therefore, is quite useful as a sealing material for automobile purpose, as a coating material for construction purpose, and as a sealant.

What is claimed is:

1. A moisture curable polyurethane composition comprising
 (A) a urethane prepolymer, and
 (B) a morpholine catalyst comprising
  (i) a dimorpholinodiethylether represented by formula (1):

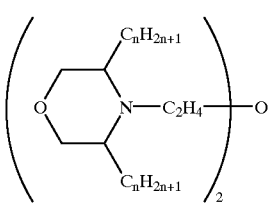

Formula (1)

wherein n is 0, 1, or 2, and
 (ii) a N,N-dimethylaminoethylmorpholine represented by formula (2):

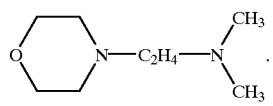

Formula (2)

2. The moisture curable polyurethane composition according to claim 1 wherein content of the dimorpholinodiethylether (i) in the polyurethane composition is less than 0.15% by weight.

3. The moisture curable polyurethane composition according to claim 1 wherein content of the N,N-dimethylaminoethylmorpholine (ii) in the polyurethane composition is in the range of 0.04 to 2% by weight.

4. The moisture curable polyurethane composition according to claim 1 wherein the polyurethane composition further comprises
  (C) 2 to 20% by weight of heavy calcium carbonate having an average particle diameter of 1.0 to 3.2 μm.

5. The moisture curable polyurethane composition according to claim 1 wherein said urethane prepolymer (A) is an urethane prepolymer which has free isocyanate group.

6. A moisture curable polyurethane composition comprising
  (A) a urethane prepolymer,
  (B') at least one tertiary amine catalyst having morpholino group and/or dimethyamino group, and
  (D) at least one silane adduct selected from the group consisting of
    (D-1) a silane adduct obtained by addition reaction between
      a polyisocyanate which is a product of urethane reaction between at least one member selected from xylene diisocyanate, 1,3- or 1,4-di-(isocyanate methyl)cyclohexane, and derivatives thereof, and a compound having at least three active hydrogen atoms, and which has at least three isocyanate groups in one molecule, and
      a secondary aminoalkoxysilane wherein the nitrogen atom has bonded thereto an aromatic ring or a derivative thereof, and
    (D-2) a silane adduct having a lysine skeleton obtained by addition reaction between a lysine isocyanate having 2 or 3 isocyanate groups and a secondary aminoalkoxysilane wherein the nitrogen atom has bonded thereto an aromatic ring or a derivative thereof.

7. The moisture curable polyurethane composition according to claim 6 wherein the tertiary amine catalyst (B') is the morpholine catalyst (B) of claim 1 comprising
  (i) the dimorpholinodiethylether represented by the formula (1), and
  (ii) the N,N-dimethylaminoethylmorpholine represented by the formula (2).

8. The moisture curable polyurethane composition according to claim 7 wherein the composition contains, as the tertiary amine catalyst (B'), 0.05 to 0.15 parts by weight of dimorpholinodiethylether (i) and 0.05 to 2 parts by weight of N,N-dimethylaminoethylmorpholine (ii) per 100 parts by weight of the total of the urethane prepolymer (A) and the silane adduct (D).

9. The moisture curable polyurethane composition according to claim 6 wherein said tertiary amine catalyst (B') is bis(2-dimethylaminoethyl)ether (iii) represented by formula (3):

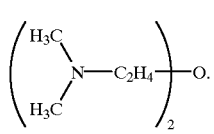

(3)

10. The moisture curable polyurethane composition according to claim 6 further comprising
  (E) a phosphite compound, a phosphonous acid ester compound, phosphinous acid ester compound, a phosphine compound; and/or mixtures thereof.

11. The moisture curable polyurethane composition according to claim 6 further comprising
  (F) an organotin compound.

12. The moisture curable polyurethane composition according to claim 11 wherein the composition contains 0.002 to 0.1 parts by weight of said organotin compound (F) per 100 parts by weight of the total of the urethane prepolymer (A) and the silane adduct (D).

13. The moisture curable polyurethane composition according to claim 6 wherein said urethane prepolymer (A) is urethane prepolymer having free isocyanate group.

14. The moisture curable polyurethane composition according to claim 9 further comprising
  (E) a phosphite compound, a phosphonous acid ester compound, phosphinous acid ester compound, a phosphine compound, and/or mixtures thereof.

15. The moisture curable polyurethane composition according to claim 1 further comprising
  (F) an organotin compound.

* * * * *